United States Patent [19]
Wilcox et al.

[11] Patent Number: 5,406,350
[45] Date of Patent: Apr. 11, 1995

[54] IMAGE RECORDING APPARATUS

[75] Inventors: Stephen H. Wilcox, Taichung, Taiwan, Prov. of China; Paul G. Graham, Fairport, N.Y.

[73] Assignee: Eastman Kodak Company, Rochester, N.Y.

[21] Appl. No.: 173,599

[22] Filed: Dec. 27, 1993

[51] Int. Cl.⁶ .................... G03B 27/52; G03B 27/32
[52] U.S. Cl. ............................................ 355/41; 355/64
[58] Field of Search ................ 355/40, 41, 50, 64; 353/25, 26 R

[56] References Cited

U.S. PATENT DOCUMENTS

| | | | |
|---|---|---|---|
| 3,669,539 | 6/1972 | Okuyama | 355/64 |
| 3,981,582 | 9/1976 | Bookless | 355/75 |
| 4,013,360 | 3/1977 | Burke et al. | 355/27 |
| 4,259,007 | 3/1981 | Arai et al. | 355/27 |
| 4,283,621 | 8/1981 | Pembroke | 235/375 |
| 4,291,972 | 9/1981 | Laska et al. | 355/40 |
| 4,324,474 | 4/1982 | Karemer et al. | 355/74 |
| 4,432,637 | 2/1984 | Baschung | 355/40 X |
| 4,649,422 | 3/1987 | Rauskolb et al. | 358/76 |
| 4,693,591 | 9/1987 | Saijo et al. | 355/41 |
| 4,708,464 | 11/1987 | Otsuki et al. | 355/45 |
| 4,777,515 | 10/1988 | Aikoh et al. | 355/64 |
| 4,783,686 | 11/1988 | Ishii et al. | 355/64 |
| 4,803,505 | 2/1989 | Saijo et al. | 354/80 |
| 4,937,617 | 6/1990 | Kito | 355/41 |
| 4,963,920 | 10/1990 | Fukushima | 355/40 |
| 4,967,228 | 10/1990 | Ishii et al. | 355/40 |
| 5,202,724 | 4/1993 | Nagata et al. | 355/64 |
| 5,274,418 | 12/1993 | Kazami et al. | 355/40 |
| 5,278,610 | 1/1994 | Ishiwatari et al. | 355/64 |

*Primary Examiner*—Richard A. Wintercorn
*Attorney, Agent, or Firm*—Dennis R. Arndt

[57] ABSTRACT

A microfilm camera which is adapted to photographing images on a reduced scale of documents placed on a support table and to photograph a mark also on the film in the vicinity of each image thereon so that the location and/or size of the original image corresponding to the document photographed can be located from the size and location of the marks by automatic retrieval equipment. When a bad or unsatisfactory exposure is made, the operator merely presses the appropriate button(s) and the unwanted image on the film does not receive either an image address or an image mark and for all intents and purposes, the image is "lost" on the roll of film. The unwanted image is on the roll of film, but it cannot be automatically retrieved because the image does not have an image mark associated with it. This error correction is accomplished by having the document photographed and the film moved a distance of at least one image frame before the image mark and image address are applied to the film. Both the image address and the size of the image mark are retained in memory until the latent image on the film has been moved out of the optical path to a writing station that can generate the required image mark and image address at a point downstream from the optical path of the microfilm camera

19 Claims, 7 Drawing Sheets

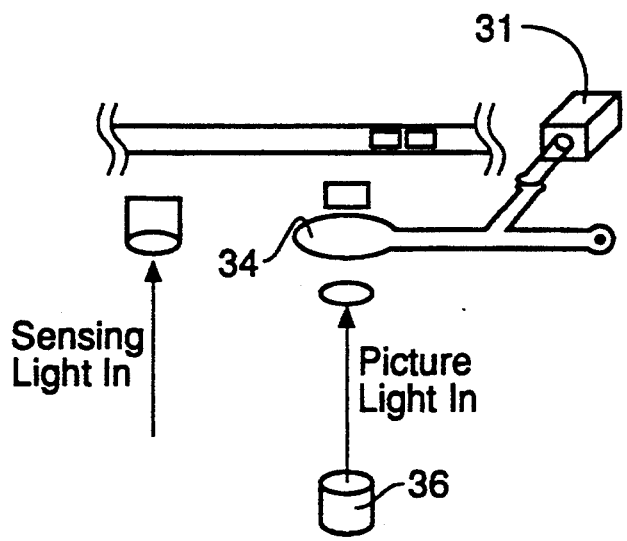
FIG. 3
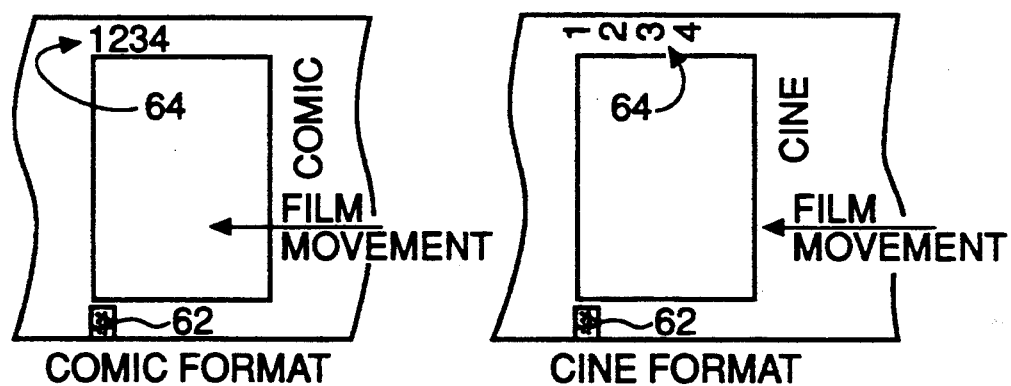
FIG. 4a　　　FIG. 4b

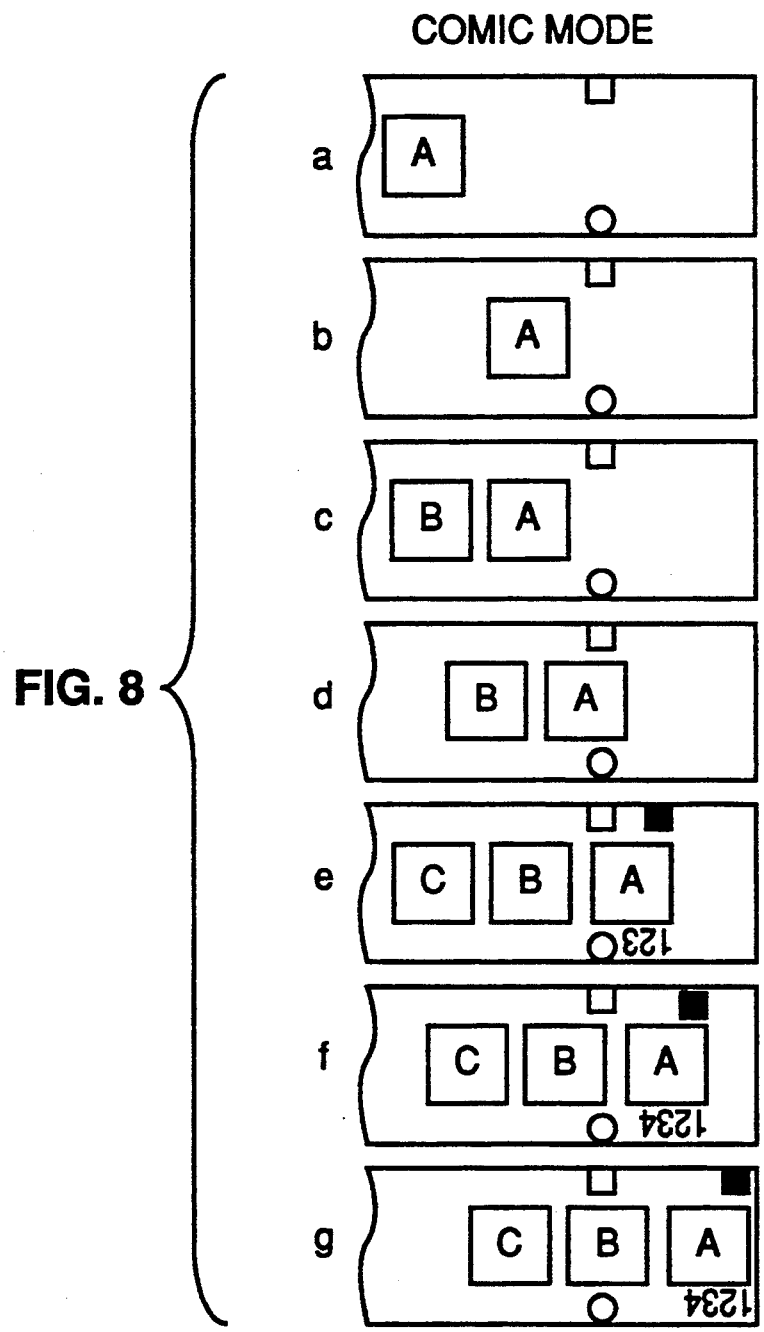

IMAGE RECORDING APPARATUS

BACKGROUND OF THE INVENTION

1. Field of the Invention

The present invention relates to an image-recording method and apparatus for recording an image of an original document on a recording medium such as film and more particularly, to a method and apparatus for placing additional information relevant to the image of the original document adjacent the image thereof and for withholding the information when the image of the document is deemed defective somehow.

2. Description of the Related Art

Image-recording cameras for sequentially recording images of originals such as various types of documents on a reduced scale on a strip of microfilm are known.

Of numerous photographic microfilm recording devices or microfilm cameras, the microfilm camera has been suggested in which, while the size of a single frame in the microfilm corresponds to the size of a document to be recorded on the microfilm, both of a single-size image and a double-size image can be photographically recorded. In this type system, for retrieving purposes, an image marking is also photographically recorded on the microfilm at a location in the vicinity of and peripheral to each image recorded on the microfilm.

As is well known to those skilled in the art, images recorded on the microfilm are so miniature that, in most cases, unless use is made of a microfilm reader or printer or combined reader and printer, what is expressed in the microfilmed image cannot be legible. Therefore, when one or some of the microfilmed images are desired to be viewed through the microfilm reader or to be copied through the printer, a controller-based retrieval is generally carried out to locate such one or some of the microfilmed images. More specifically, an operator of, for example, the microfilm reader has to input, into a retrieval system, an address of one of the microfilmed images which is desired to be viewed through a screen of the microfilm reader, so that the retrieval system can browse the microfilm to locate such one of the microfilmed images and then to cause it to be displayed through the reader screen. The retrieval system while browsing the microfilm counts the number of image markings, one for each microfilmed image, and issues a stop command to interrupt the transport of the microfilm reader when the count of the image markings coincides with a particular value assigned by the input address, thereby enabling the particular microfilmed image to be displayed through the reader screen.

With one image marking photographically recorded for double-size images as well as single size images such a retrieval process could encounter myriad problems. Therefore, the retrieval on a page basis requires a preparatory calculation to determine how many pages are to be transported to a desired page of the microfilmed transcript to locate the desired page, followed by a manual procedure to bring the image of the desired page in register with the reader screen.

U.S. Pat. No. 5,202,724 addressed this problem by providing a microfilm camera wherein, for each double-size image, two image markings spaced a predetermined distance from each other can be photographically recorded on the microfilm thereby facilitating the subsequent image retrieval.

A problem not addressed by the above invention is what happens when an operator of a microfilm camera determines that the last exposure was bad. Bad exposures may include such things as a corner of the document to be photographed is turned over covering some information on the document. The document may not have been properly placed on the copyboard correctly. It may have been skewed or was partially outside of the exposure area. The operator's hand may have been in the exposure area when the exposure was made. In any of these instances, the operator could readily recognize that a bad exposure was made and make a second exposure of the document during the next exposure period after correcting the problem.

Thus, it can be seen that in the first situation, not enough image marks were being applied for each document photographed because double documents only received one image mark for two pages. As a result of the bad exposure situation, image marks were being placed adjacent unwanted exposures. Accordingly, the image count on the roll of film would have to be modified during the retrieval process but problems can be encountered depending how many errors appear on a film roll and if they are grouped together or spread throughout the film. If they are grouped together, the unwanted images may be removed and the film spliced; however, if they are spread throughout the roll of film, the image count must be corrected differently, depending on what portion of the film roll one is searching. Trying to eliminate these error counts to insure accurate retrieval of the desired image is cumbersome and involves errors being made during retrieval or requires a device which is complex in construction and inefficient.

SUMMARY OF THE INVENTION

An object of the present invention is to provide a microfilm camera which is adapted to photograph images on a film of documents on a reduced scale and to photograph a mark on the film in the vicinity of each image thereon so that the location and/or size of the original image corresponding to the photograph can be determined and located from the physical characteristics of the mark. When a bad exposure is made, the operator merely presses the appropriate button(s) and the unwanted image does not receive either an image address or an image mark and, for all intents and purposes, the image is "lost" on the roll of film. The unwanted image is on the roll of film, but it cannot be automatically retrieved because the image does not have an image mark associated with it. To accomplish this correction, the document is photographed and the film moved at least once before the image mark and image address are applied to the film. Both the image address and the physical characteristics of the image mark are retained in a memory until the film is to receive that information.

The present invention provides a camera for photographing images of documents on a film strip at a reduced scale extending between an upstream supply of film to a downstream take-up of film. The camera comprising a document support table for placing a document to be photographed thereon and means for projecting along an optical path a reduced image of the document placed on the table, onto the film strip to form a latent image thereof. There is a shutter for movement into and out of the optical path for controlling the exposure time of the image of the document on the film and means for moving the latent image out of the optical path in a downstream direction after exposure has been completed and moving an unexposed portion of the film from an upstream direction into the optical path. There are means for writing an image mark and an image address on the film adjacent the latent image of the document at a position downstream from the optical path and means for storing information at the time the latent image of the document is formed concerning the size of the image mark and the image address and means for purging said stored information relating to an image prior to the information being written when said latent image associated therewith is deemed defective in some way.

BRIEF DESCRIPTION OF THE DRAWINGS

This and other objects and features of the present invention will become clear from the following description taken in conjunction with preferred embodiments thereof with reference to the accompanying drawings in which:

FIG. 3 is a schematic diagram showing the sensing light for the exposure control and the lens and shutter controlling light along the optical path of the camera;

FIG. 4a and 4b is a plane view illustrating part of a microfilm strip on which original images and relevant images as information for retrieval have been photographed by the photography apparatus of this invention; the image address in FIG. 4a is in comic format and FIG. 4b is in cine format;

FIG. 8 illustrates in a series of steps a–g the photographing of images "A", "B" and "C" showing timing with respect to film movement and positioning when the image address is in the comic mode.

DETAILED DESCRIPTION OF THE PREFERRED EMBODIMENTS

Figure 1:
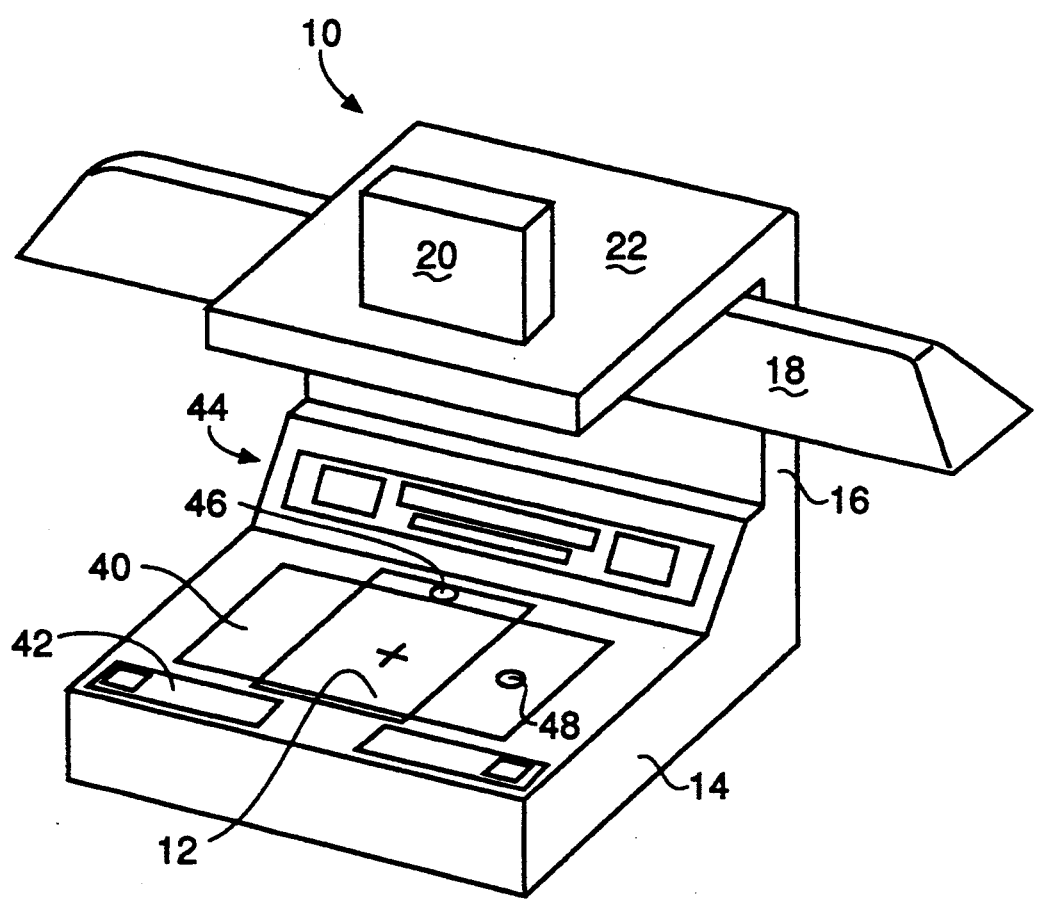
FIG. 1 is a schematic perspective view of the microfilm camera according to the present invention.
Figure 2:
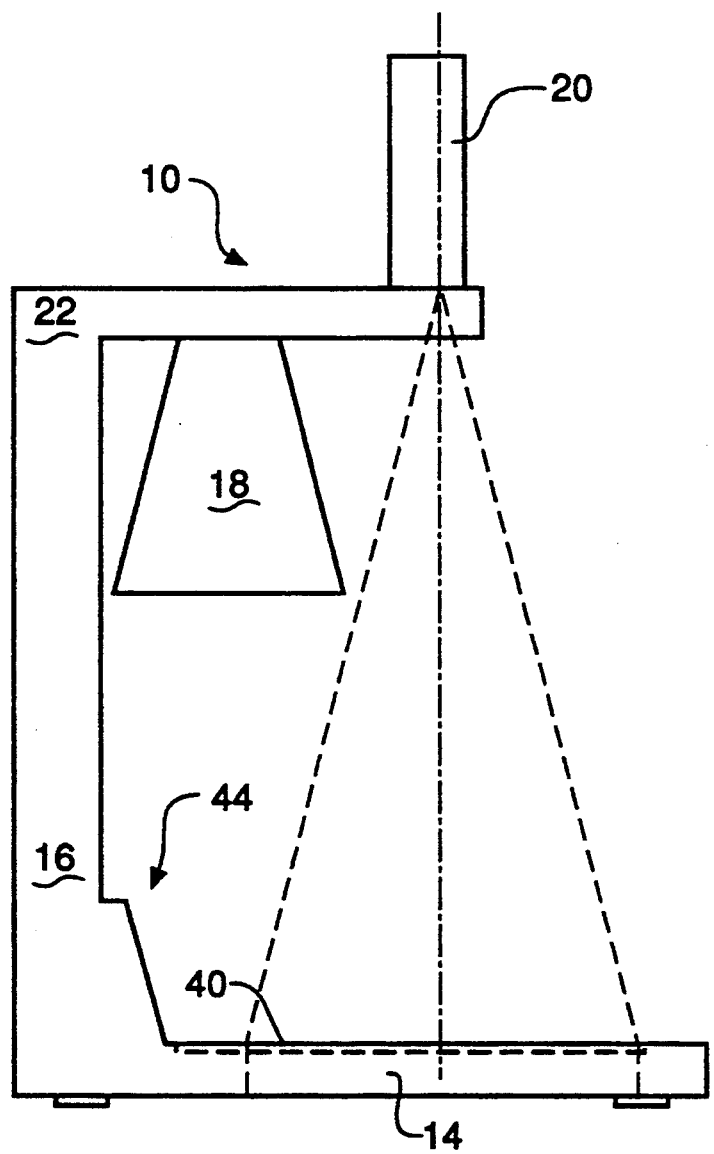
FIG. 2 is a side elevational view of the microfilm camera shown in FIG. 1.

Referring first to FIGS. 1 and 2 a microfilm camera generally identified by 10 is so far shown, employed in the form of a planetary camera or so-called planar type camera and is so designed that an actual photo-taking can take place while a document 12 to be microfilmed and the photosensitive microfilm is held stationary.

The microfilm camera 10 comprises a generally rectangular base 14 having a pair of long side edges and a pair of short side edges and also having a support member 16 erected so as to extend upwardly from the short side rear edge of the base 14. The support member 16 has a generally elongated illuminator lamp 18 mounted on support member 16 and extending along one of the short side edges of the base 14. Use of this type of illumination lamp does not disturb the operator when turning over leaves of the original documents being photographed. A camera housing 20 of a generally box-like configuration is mounted on a cantilevered shelf 22, one side of what is attached to the support member 16.

Figure 6:
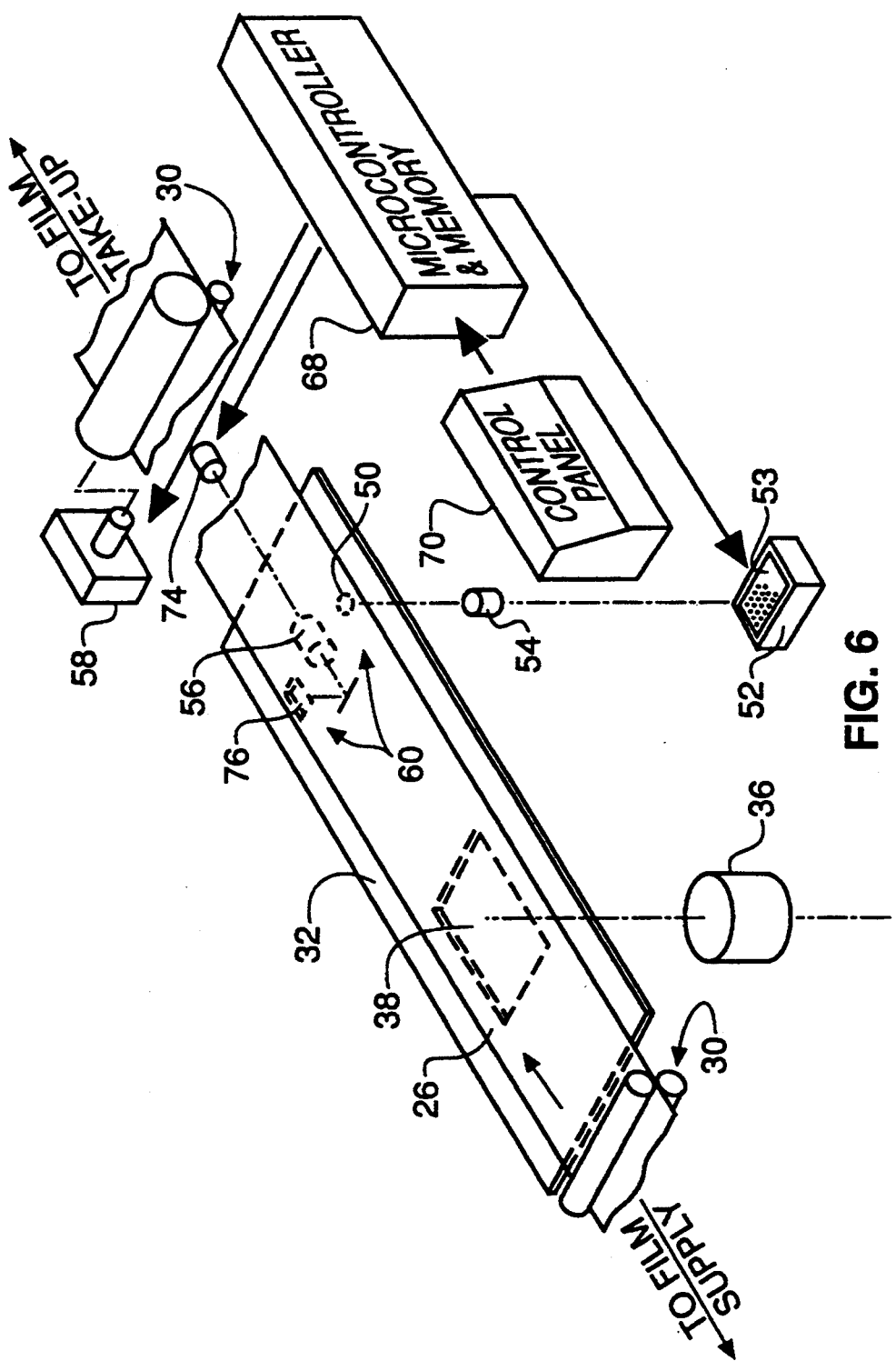
FIG. 6 illustrates a schematic diagram of the apparatus for applying an image address and image mark to an image frame on a strip of microfilm.

Within the camera housing 20, there is accommodated a photosensitive film supply, a film take-up with intermediate feed rollers 30 are disposed in spaced relation to each other along the path of the transport of the microfilm from the film supply towards the film take-up (see FIGS. 3 and 6). An aperture plate 32 positioned intermediate between the feed rollers 30, a shutter 34 (FIG. 3) supported generally below the aperture plate 32, and a zoom lens assembly 36 disposed immediately below the aperture plate 32.

When a microfilm recording is to be made, each frame of the microfilm is transported from the film supply onto the film take-up as is well known in the art. The film is stopped and held stationary at a position immediately above the aperture plate 32 and the image of the document is registered through an aperture 38 in the aperture plate 32 and then through the zoom lens assembly 36 with a document placed on the document support table 40 of the base 14. The shutter 34 (FIG. 3) is adapted to selectively open and allow the image of the document to pass through both the lens assembly 36 and the aperture 38 in the aperture plate 32 to form an image on the microfilm 26 in a frame determined by the aperture 38 in the aperture plate 32. After the exposure has been made for a predetermined time, the shutter 34 is closed, blocking the light along the optical path of the camera.

The lens assembly 36 is comprised of a zoom mechanism so that original copies of different sizes can be photographed onto the same sized screen by the zooming operation without the vertical level of the camera housing 20 needing to be changed.

The document support table 40 is positioned immediately below the camera housing 20 mounted on the cantilevered shelf 22. The illuminator lamp 18 that extends parallel to the long side edge of the base 14 such. that it provides appropriate light on any documents placed on the support table 40. The base 14 also has a generally elongated control console 42 mounted at the front so as to extend along the other short side edge thereof. A rear control panel 44 is also mounted along the short side edge of the base 14 where the support member 16 joins the base 14.

The document support table 40 has a pair of reflective sensor windows 46 and 48. When a document is placed thereon the proper size image of the document is projected through lens assembly 36 to form a latent microfilmed image on the strip of microfilm 26. A standard reflective sensor window 46 is mounted on the support table 40 to detect when a document needs to be reduced by a factor of 32×. This provides a means for automatically detecting an oversized document and changing the magnification of the zoom lens assembly 36 to properly image the document. A second reflective sensor window 48 is used to determine the need to enlarge the frame size imaged on the microfilm and use double frame image. The description to follow will be limited to single frame size documents as the photographing of double images is beyond the scope of the present invention.

It is to be noted that in practice of the present invention, instead of the photoconductive detector, an ultrasonic detector, a limit switch or any other detector may be employed for the size sensor windows 46 and 48.

When in use, the illumination lamp 18 illuminates the document placed on the document support table 40 and an image of the document is reflected towards the camera housing 20. If, at this time, the shutter 34 is in an open position clearing the optical path between the lens assembly 36 and the aperture 38 in the aperture plate 32, one of the frames of the microfilm then is aligned with the aperture 38 in the aperture plate 32 is exposed to the reflected rays of light from the image. Which are, after having entered the camera housing 20, traveling towards the microfilm 26 through the zoom lens assembly 36 and then through the aperture 38 in the aperture plate 32. In this way, that frame of the microfilm carries a latent image corresponding to an image of the document which will subsequently be developed into a negative or positive microfilmed image. After the microfilm is completely wound on the take-up reel (not shown), it is then developed.

Referring now to FIGS. 3 and 6, the details of the aperture plate 32 and shutter 34 will be described. The aperture is generally rectangular in shape having a longitudinal axis lying substantially parallel to the direction of film transport.

As best shown in FIG. 3, the shutter 34 is adapted to selectively open and intercept the optical path between the lens assembly 36 and the microfilm. The shutter is controlled by a solenoid 31 with the shutter normally being biased in the closed position.

An automatic exposure control system which includes a sensor in the camera 20 near lens assembly 36. This signal is used to control the shutter 34 in the camera 20. This results in more precise exposure times with respect to both shutter variation from camera to camera and various document reflectance characteristics.

The marking exposure station is generally identified by 60 and will be described in detail with particular reference to FIG. 6. The marking exposure station 60 is used to imprint an image mark 62 (FIG. 4) on one edge of the film adjacent to and peripheral to each frame of the microfilm where a corresponding microfilmed image is eventually formed. On the opposite edge of the film, an image address 64 is printed.

FIGS. 4a and 4b show film segments each containing an existing latent image on it, with an image address 64 in FIG. 4a being in comic format and FIG. 4b being in cine format. The latent image of the document is moved out of the optical path and downstream from the aperture 38 where a second image is exposed and likewise moved in the downstream direction. It is after this time that the exposure of the image address 64 is begun. With the next image movement, the leading edge of this latent image passes over opening 50 in the aperture plate 32 where the characters are placed on the film by a 5×7 portion of a 7×9 LED array that forms dot matrix characters on the film as it moves over the array. As the first latent image passes the opening 50 in the aperture plate 32, areas near the edge of the film will receive an image address that is comprised of alphanumeric characters that will be formed by the LED array in the form of dot matrix characters that are generated additively when the film is in motion. It should be understood that all characters are formed using a 5×7 matrix in orthogonal orientations, but the 7×9 LED array was commercially available.

Figure 5:
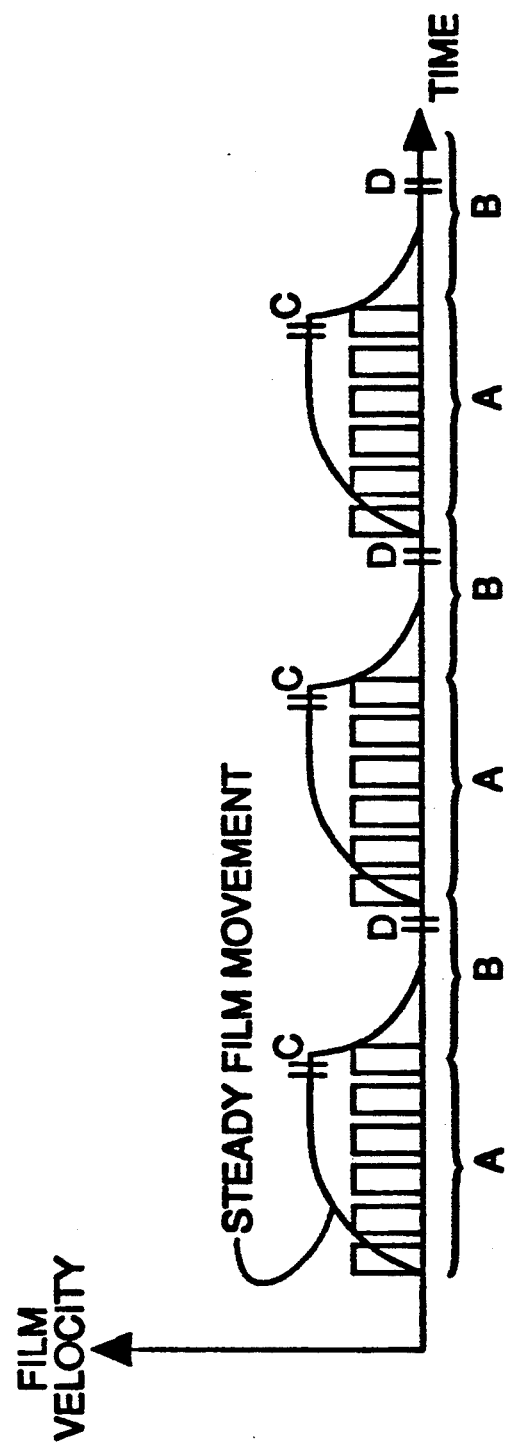
FIG. 5 shows graphically a curve of film movement of film movement vs. velocity superimposed upon stepper motor pulses on the time axis.

FIG. 5 shows graphically a curve of film movement vs. velocity superimposed upon stepper motor pulses on the time axis. This figure also illustrates when image address writing and image mark writing, to be discussed next, occur relative to the movement of film.

The time periods labeled "A" in FIG. 5 indicate time periods during which a series of pulses are applied to the stepper motor 58 to accelerate the film drive through a series of gears (not shown) and allow the film 26 to reach a steady velocity. The number of stepper motor 58 pulses applied during the time interval "A" is chosen so that the film will move a distance appropriate for the LED dot matrix 52 character image and an associated space to appear on the film. Multiple activations of the 7×9 LED dot matrix 52 character generator will result in the formation of a latent, multiple character, image address on the film after the film has been processed. Use of the 7×9 LED dot matrix 52 character generator allows the image address to be written in either comic format or cine format as shown in FIG. 5.

The time intervals labeled "B" in FIG. 5 indicate time periods during which no pulses are applied to the stepper motor 58 thereby allowing the film 26 to come to a stop.

The time intervals "B" during which the stepper motor 58 receives no pulses and the film 26 is not moving at the time, but the delay is not so great as to cause an undue delay in applying the film information.

The time intervals "C" are chosen so that they are as short as possible, yet long enough to expose a latent character pattern on the film. Within the 7×9 LED dot matrix 52, only one vertical column of LEDs can be on at any one time. Accordingly, colunms in the LED array 53 are exposed sequentially at a relatively high power for a relatively short duration. It should be understood that the movement of the film 26 during sequencing of the nine columns will either foreshorten or elongate the character width depending on whether the character is sequenced from left to right or right to left.

The time intervals labeled "D" represent a very short time period during which the film is stopped and power is applied to a LED element 74, the image of which is focused optically through lens 56 to project a rectangular mark on the film 26.

The image address 64 exposure at intervals "C" and the image mark 62 exposure at intervals "D" are both applied at time intervals occurring at the end of their respective film motion with the assumption being that the respective film movement has settled to a steady state. The "C" time intervals should occur after the film velocity has reached a steady state velocity. The "D" time interval should happen after the film has decelerated to zero and has stopped.

The image mark 62 exposed on the film by LED element 74 through the rectangular image mark opening 76 in the aperture plate 32 on the opposite edge from the image address. The image mark 62 is normally adjacent the leading edge of the latent image and after the film 26 has been processed is used to retrieve the image by keeping track of a sequential count of these marks adjacent each of the images on the film. The image mark is 0.69 mm wide for the smallest mark. Larger size marks are used to indicate related documents. However, because the film is advanced, each cycle to insure proper uniformity of the image address 64 numbers, this may result in a certain number of whole cycles that will not result in the exact dimension for the medium and large image marks 62. This is compensated for by adding one extra image mark exposure segment before beginning the regular sequence of number writing for the image address and image marking. What occurs is that the system makes an image mark exposure segment and then applies one, two or three steps to the stepper motor 58. After this has taken place, the normal sequencing of the film writing and numbering takes place. This practice results in a very slight offset of the image address 64 and image mark 62 laterally across the film where the two marks would have normally been aligned. If, for some reason, this presents problems, the exposure station openings 50 and 76 for the image address 64 and image mark 62 may be offset slightly to compensate for this predicted misalignment. Alternatively, it may be seen that the extra space for the medium image mark may be placed in the middle or end, whatever is preferred.

Figure 7:
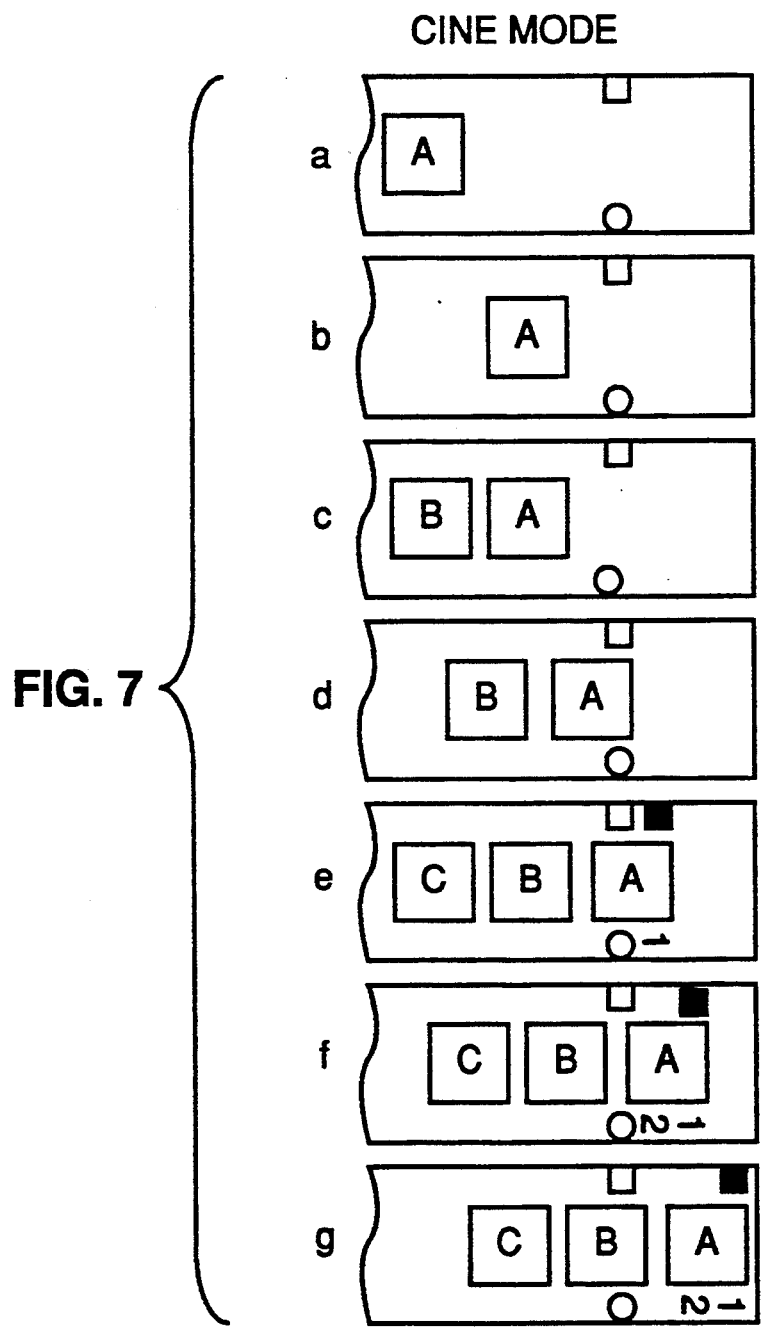
FIG. 7 illustrates in a series of steps a–g the photographing of images "A", "B", and "C" showing timing with respect to film movement and positioning when the image address is in the cine mode.

FIG. 7 and 8 illustrate in a step-by-step description of how the image mark and image address are placed on the film in the cine mode and comic mode, respectively. It should be understood that the image is approximately 9.28 mm in width and that the image mark and image address are placed on the film approximately 17.4 mm from the exposure aperture 38 where the latent image of the document is formed. At the time the document exposure occurs, the size of the image mark and the number of the image address are placed in memory to be applied to the film at a later time. After image "A" is exposed through aperture 38 (FIG. 7a) onto the film 26 supported by aperture plate 32. After this exposure, the film is advanced 17.4 mm or a total of 103 steps by the stepper motor 58. Each motor step is 1.03 mm so the film has advanced 10.3 mm as shown in FIG. 7b. Image "B" is exposed next as shown in FIG. 7c. The size of the image mark and the image address associated with image "B" are placed in memory 68 for later writing. The film 26 is then advanced 74 steps or 7.4 mm so that the image "A" is in line with the edge of image mark opening 76 and the image address opening 50 as shown in FIG. 7d.

Image marking and film character writing is begun as the film is advanced in groups of four steps for 7 cycles until the edge of the yet to be exposed image frame "C" is positioned in the film gate over the aperture 38 where the film is stopped.

A latent image is formed for image from "C" in FIG. 7e and the image mark size information and the image address information for the image "C" is stored in memory 68 for later writing. The film is advanced in cycles of four steps and film writing for the remainder of the image address for image frame "A" is completed (four cycles of four steps). The film will then be advanced additional steps so as to place image frame "B" adjacent the image mark opening 76 and the image address opening 50. Filming can continue by repeating the steps from FIG. 7d-7g.

FIG. 8 illustrates the steps for exposure when the comic mode is used to write the image address on the film. The comic mode is very similar to the steps that occurred in the cine mode but the slight differences are due to the orientation of the numbers in the image address which are smaller along the length of the film. FIG. 8a shows that image frame "A" is exposed and the size of the image mark required as well as the image address are placed in memory 68 for later writing. After exposure, the film 26 is advanced 103 motor steps or 10.3 mm. The film is now positioned such that the area for image frame "B" is over the aperture 38 in aperture plate 32. Exposed image frame "B" as shown in FIG. 8c and the film 26 is advanced, 74 steps which is equal to 7.4 mm such that the leading edge of image frame "A" is adjacent the image mark opening 76 and the image address opening 50 as shown in FIG. 8d. Next image marking and film character writing take place by advancing the film in groups of 3 motor steps for 10 cycles until the edge of the yet to be exposed image frame "C" is positioned in the gate over aperture 38 and the film is stopped. Image frame "C" is exposed and the corresponding information concerning the size of the image mark and the image address associated with that image frame is placed in memory 68 where it will be used to write that information on the film 26 adjacent image frame "C" at a later time. The film 26 is advanced for 1 cycle of 3 steps so as to complete the image address for image frame "A". The film is then advanced 71 steps until image frame "B" is adjacent the image mark opening 76 and the image address opening 50. To continue the film is advanced as shown in FIG. 8d and repeated through to FIG. 8g.

With the above explanation concerning film movement and film writing of both the image mark and image address, one can understand the advantage of doing the image mark and image address downstream from the associated exposure of the image frame. Accordingly, it can be appreciated that in the event a bad exposure was made of image frame "A" in either the cine or comic mode of operation. The error may be corrected by making a new and satisfactory exposure at image frame "B" of the same document. As shown in FIGS. 7d and 8d, the writing of information associated with image frame "A" may be terminated and the information in memory 68 associated with image frame "A" would be discarded. That same information would have been incorporated with image frame "B" and would be applied to image frame "B" in step g of either FIG. 7 or FIG. 8.

Thus, it can be seen that the spoiled image at image frame "A" would appear on the film after processing, but would not be recoverable using automatic retrieval techniques. The spoiled image would not be counted by retrieval equipment and, therefore, would act as if it were erased from the database of images. Accordingly, there would not have to be any adjustment in the count to compensate for the bad exposure as would be required of an image mark had been placed on the film adjacent the bad exposure.

For example, and considering only single-frame exposures, the following occurs: The frame just exposed is moved to the left 9.28 mm plus some space for the interframe gap usually 1 mm or more to the left. Subsequently, when the next frame is taken, the film is once again advanced and it is at this time that the first exposure receives the image numbers and image marks. It is the process of holding the information in memory between the frames that allows an operator to make a determination that a frame that has just been taken was defective in some way and should be eliminated from the active search category. This is accomplished by eliminating the image mark information and image address number from the memory. Accordingly, the image will remain on the film, but it is unretrievable through automated means because there is no image mark 62 associated with the image. In essence, the operator has a period of time while the exposed image frame is in a holding mode to make the determination of whether or not the image is wrong in any respect and should be lost (rendered unretrievable) upon the taking of the subsequent frame.

This whole process is controlled by having a function called "repeat exposure". When the function is implemented, the document previously exposed but was immediately found somehow not to be a good image, is taken again and the proper image address 64 and image mark 62 are applied to the second exposed good image of the document. The first image, which was subsequently determined to be bad, had no image address or image marks applied to it.

As each frame is taken and the image is moved to the holding zone which is between where the document exposure was made and the image address and image mark 62 size are made. The document image is advanced and passes the position where the image address 64 and image mark 62 are exposed, that is when the stored information is exposed onto the film. It is this memory that is affected during the repeat exposure period. This memory is set to withhold both the image mark 62 and image address 64 as the document image on the film passes the exposure areas for the image mark 62 and image address 64.

The "repeat exposure" function is initiated by first correcting the problem with the document which prompted the operator to want to make a new image. Typically, this would be a hand in the document area or a corner that has been turned over or possibly a stick-on label that had not been removed, etc. Once the problem with the real document has been corrected, then the operator presses the ALT key and the EXPOSURE key and a new exposure is made. This sequence of events causes the information that was to be applied to the first unwanted image of the document to be set to zero or that information to be erased that was to be applied to the first image of the document is now applied to the second good image of the same document.

The microcomputer 68 serving as a control means for the microfilm camera 20 has respective input ports for receiving an output signal from the size sensor windows 46 and 48 and an EXPOSE signal from a key on the control panel 70 and adapted to be manipulated when actual photography is taking place.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A camera for photographing images of documents on a film strip at a reduced scale, said film extending between an upstream supply of film to a downstream takeup of film, said camera comprising:
    a document support table for placing a document to be photographed thereon;
    means for projecting along an optical path a reduced image of the document placed on the table, onto the film strip to form a latent image thereof;
    a shutter for controlling the exposure time of the latent image of the document on the film;
    means for moving the film to advance the latent image out of the optical path in a downstream direction after exposure has been completed and to advance an unexposed portion of the film from an upstream position into the optical path;
    means at a position downstream from the optical path for writing an image mark and an image address on the film adjacent the latent image of the document;
    means for storing information at the time the latent image of the document is formed concerning the size of the image mark and the image address; and
    means for inhibiting the writing of said stored information relating to an image when said latent image associated therewith is deemed defective in some way.

2. The microfilm camera as set forth in claim 1 wherein the image address is formed on the film using a $7 \times 9$ dot matrix array.

3. The microfilm camera as set forth in claim 2 wherein the image mark is formed using a LED.

4. The microfilm camera as set forth in claim 3 wherein a stepper motor us used to control film movement.

5. The microfilm camera as set forth in claim 1 wherein the image address is written while the film is in motion.

6. The microfilm camera as set forth in claim 2 wherein the image mark is formed while the film is stationary.

7. A method of photographing images of documents on a film strip at a reduced scale, said film extending between an upstream supply of film to a downstream takeup of film, said method comprising the steps of:
    supporting the document to be photographed;
    projecting a reduced image of the supported document along an optical path, onto the film strip to form a latent image thereof;
    controlling the exposure time of the latent image of the document on the film;
    moving the film to advance the latent image out of the optical path in a downstream direction after exposure has been completed and to advance an unexposed portion of the film from an upstream position into the optical path;
    writing an image mark and an image address on the film adjacent the latent image of the document at a position downstream from the optical path;
    storing information at the time the latent image of the document is formed concerning the size of the image mark and the image address; and
    inhibiting the writing of said stored information relating to an image when said latent image associated therewith is deemed defective in some way.

8. A method as set forth in claim 7 wherein the image address is formed using a $5 \times 7$ dot matrix array.

9. A method as set forth in claim 8 wherein the image mark is formed using a LED.

10. A method as set forth in claim 8 wherein a stepper motor is used to control film movement.

11. A method as set forth in claim 7 wherein the image mark address is written while the film is in motion.

12. A method as set forth in claim 7 wherein the image mark is formed while the film is stationary.

13. A camera comprising:
    an exposure device adapted to produce a series of images along a strip of film;
    a selectively operable index device adapted to place image retrieval marks on the strip of film, said image retrieval marks being associated with at least some of the images; and
    means for selectively operating the index device so as to associate image retrieval marks with images deemed to be good and to not associate image retrieval marks with images deemed to be defective.

14. A camera as defined in claim 13 wherein said index device is adapted to place marks on the strip of film adjacent to their associated images.

15. A camera as defined in claim 13 wherein said marks include encoded information concerning the size of the associated image.

16. A camera as defined in claim 13 wherein said marks include encoded information concerning the location of the associated image on the strip.

17. A camera as defined in claim 13 wherein said index device is downstream of said exposure device.

18. A method for producing a series of images along a strip of film and for providing for automatic retrieval thereof; said method comprising:
 producing a series of images along the strip of film; and
 selectively placing image retrieval marks on the strip of film to associate image retrieval marks with images deemed to be good and to not associate image retrieval marks with images deemed to be defective.

19. A method as defined in claim 18 wherein said marks are placed on the strip of film adjacent to their associated images.

* * * * *